Nov. 2, 1954     W. J. GREENLEAF     2,693,019
CUTTING TOOL
Filed May 23, 1952

INVENTOR
Walter J. Greenleaf
BY Ralph Hammar
ATTORNEY

United States Patent Office 2,693,019
Patented Nov. 2, 1954

2,693,019

CUTTING TOOL

Walter J. Greenleaf, Meadville, Pa.

Application May 23, 1952, Serial No. 289,577

1 Claim. (Cl. 29—96)

This invention is a cutting tool using standard rectangular bits of hard material, such as cemented carbides, clamped against a seat on a holder. The cutting thrust is taken by a shoulder on an adjustable clamp which is adjustable toward the cutting edge of the bit and can be inclined so that a minimum of grinding is required on the cutting edge. There is also an independently adjustable abutment on the holder moving the bit endwise to accommodate wear on the cutting point. The combination of the two way adjustment eliminates needless grinding and increases the useful life of the bits.

Figure 1:
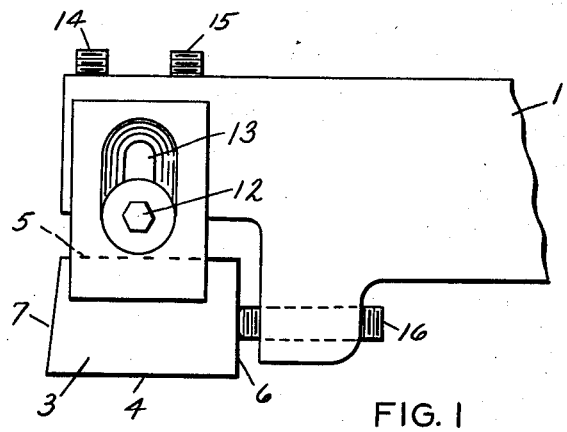
Figure 2:
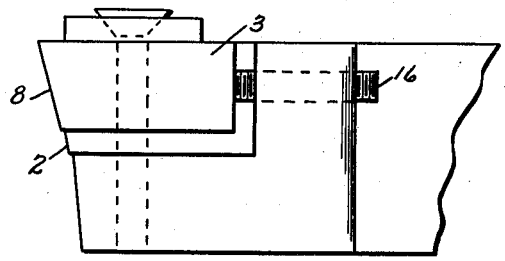
Figure 4:
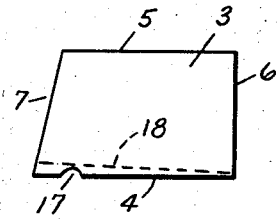
Figure 3:
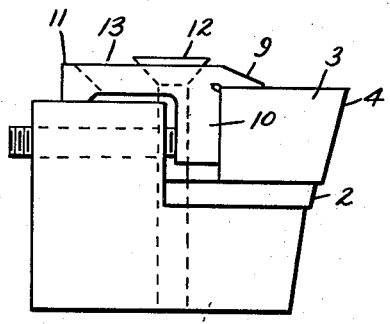
Figure 5:
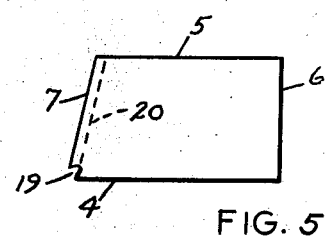

In the accompanying drawing, Fig. 1 is a top plan view of a cutting tool, Fig. 2 is a side elevation, Fig. 3 is an end elevation, Fig. 4 is a diagrammatic view illustrating grinding of the cuttingt edge of the tool bit, and Fig. 5 is a diagrammatic view illustrating grinding of the cutting point of the tool bit.

The invention is shown applied to one of the standard forms of cutting tools having a holder 1 provided at its front end with a flat seat 2 usually in the form of a hardened steel insert for receiving a generally rectangular tool bit 3. The tool bit has front and rear edges 4 and 5 and end edges 6 and 7. The front edge 4, which serves as the cutting edge overhangs slightly the front edge of the seat 2 and usually is ground as indicated at 8 to provide clearance. The intersection of the front edge 4 with the end edge 7 provides the cutting point of the tool bit. Also, for reasons of clearance, the edge 7 varies from a right angle to the edge 4 to provide the desired clearance. These clearance angles vary with the work and do not prevent the tool bit from being described as generally rectangular.

The bit is held on the holder by a clamp having a clamping face 9 engaging the top rear portion of the bit, and having a shoulder 10, which engages the rear edge 5 of the bit. The cutting thrust on the cutting edge 4 is primarily down against the seat 2, but there is a substantial component of the cutting thrust which is normal to the shoulder 10 on the clamp. The clamping face 9 merely exerts sufficient pressure to hold the bit on the seat so that it will not fall off. The clamp has a shank 11 which extends over the top of the holder 1 and is secured thereto by a bolt 12 extending through an elongated slot 13 in the shank. The elongated slot 13 permits a substantial adjustment of the clamp toward the cutting edge of the tool bit, the adjustment being made by two adjusting screws 14 and 15 threaded into the holder 1 and engaging the rear side of the shoulder 10 on the clamp. The screws 14 and 15 transmit the cutting thrust from the shoulder to the tool holder. Because the screws 14 and 15 are independently adjustable, the shoulder 10 need not be parallel to the cutting edge 4, but may be inclined thereto. There is an independent adjustment for advancing the bit towards the cutting tip, which comprises an adjusting screw 16 threaded in the holder and engaging the edge 6 of the bit. The adjusting screw 16 does not have to take appreciable cutting thrust since the cutting thrust is predominately at right angles to the screw 16 or toward the shoulder 10. The adjusting screw does however locate the bit upon its seat 2 independently of any adjustment of the clamp by means of the adjusting screws 14 and 15.

Figs. 4 and 5 illustrate the saving in grinding made possible by the independent adjustment. In Fig. 4, the grinding is made necessary by a nick 17 on the cutting edge 4. Because chips pile up in the nick and quickly enlarge it, it is necessary that the cutting edge be ground back of the nick. Because of the independent adjustment provided by the adjusting screws 14 and 15, the cutting edge can be re-ground on dotted line 18. It is true that this makes a slight change in the angle of the front edge 7 but the change is slight and is ordinarily not important. When the cutting edge is ground along the line 18 the new cutting edge can be brought to the same position as the old cutting edge, by loosening the bolt 14 and turning the adjusting screw 14 forward. Fig. 5 illustrates a condition which is less frequent in occurrence where the cutting point has a nick 19 which must be dressed. This can be accomplished by grinding along dotted line 20 and then the new cutting point can be moved to the same position as the old cutting point before grinding by turning the adjusting screw 16 forward. While the greater part of the grinding is always on the cutting edge as distinguished from the end edge 7, which provides the cutting point there is, nevertheless, need for adjustment of the bit towards the cutting point in order to accommodate wear on the cutting point.

What is claimed as new is:

In a cutting tool, a tool holder having a flat bit supporting portion, the flat bit supporting portion lying in a common plane throughout and being located at the junction of an end and side of the holder, a cutting bit having a flat bottom face for seating on the flat face of the bit supporting portion and being adapted for movement laterally and longitudinally across the flat portion and for projection beyond the side and end of the flat portion of the holder to present either an end cutting edge or a side cutting edge or both cutting edges simultaneously, said cutting edges forming a junction which defines a cutting point, a clamp member having a backing face for engaging and backing said bit, said clamp member being adjustable in one of said directions toward one of the outer edges of the flat supporting face and having its backing face overlying the flat supporting face and movable thereover to adjust and back said bit when adjusted towards said one outer edge, a pair of adjusting screws spaced apart along the length of the backing face and threaded into the holder and engaging said clamp member for adjusting the same toward said one outer edge, said adjusting screws being independently adjustable so that the inclination of the backing face may be varied with respect to said one outer edge of the flat supporting face, and adjustable means carried by the holder and positioned at an inner edge of the flat bit supporting portion for adjusting the bit in the other direction independent of the adjustment by said clamp member whereby said bit may be independently moved either endwise or laterally over said flat surface to accommodate wear on the cutting edges of the bit and to permit selective and independent grinding of either of the projecting cutting edges.

References Cited in the file of this patent

UNITED STATES PATENTS

| Number | Name | Date |
|---|---|---|
| 2,414,811 | Hollis | Jan. 28, 1947 |
| 2,449,823 | Sheridan | Sept. 21, 1948 |
| 2,450,365 | Thompson | Sept. 28, 1948 |

FOREIGN PATENTS

| Number | Country | Date |
|---|---|---|
| 595,420 | Great Britain | Dec. 4, 1947 |